(12) United States Patent
Emadi et al.

(10) Patent No.: US 11,385,336 B2
(45) Date of Patent: Jul. 12, 2022

(54) TIME OF FLIGHT SENSORS AND SENSING METHODS

(71) Applicant: Maxim Integrated Products, Inc., San Jose, CA (US)

(72) Inventors: Arvin Emadi, San Jose, CA (US); Charles J. Razzell, Pleasanton, CA (US); John P. Hanks, Austin, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 334 days.

(21) Appl. No.: 16/508,276

(22) Filed: Jul. 10, 2019

(65) Prior Publication Data
US 2020/0041628 A1 Feb. 6, 2020

Related U.S. Application Data

(60) Provisional application No. 62/712,952, filed on Jul. 31, 2018.

(51) Int. Cl.
| | | |
|---|---|---|
| *G01C 3/08* | (2006.01) | |
| *G01S 7/4913* | (2020.01) | |
| *G01S 7/4915* | (2020.01) | |
| *G01S 17/36* | (2006.01) | |

(52) U.S. Cl.
CPC .......... *G01S 7/4913* (2013.01); *G01S 7/4915* (2013.01); *G01S 17/36* (2013.01)

(58) Field of Classification Search
CPC ....... G01S 7/4913; G01S 7/4915; G01S 17/36
See application file for complete search history.

(56) References Cited

U.S. PATENT DOCUMENTS

| | | |
|---|---|---|
| 8,135,068 B1 | 3/2012 | Alvarez et al. |
| 8,604,436 B1 | 12/2013 | Patel et al. |
| 8,716,649 B2 | 5/2014 | Skurnik et al. |
| 8,766,162 B2 | 7/2014 | Tanase |
| 8,803,068 B2 | 8/2014 | Kerness et al. |
| 8,878,797 B2 | 11/2014 | Erdogan et al. |
| 8,908,159 B2 | 12/2014 | Mimeault |
| 9,075,443 B2 | 7/2015 | Kettle |
| 9,163,981 B2 | 10/2015 | Tanase |

(Continued)

FOREIGN PATENT DOCUMENTS

| | | | | |
|---|---|---|---|---|
| JP | 2013205092 A | * | 10/2013 | ............. G04F 10/04 |
| WO | 2012148539 A1 | | 11/2012 | |
| WO | 2016145319 A1 | | 9/2016 | |

*Primary Examiner* — Mark Hellner
(74) *Attorney, Agent, or Firm* — TIPS Group

(57) ABSTRACT

A time of flight sensor includes a time of flight (TOF) processor having a digital TOF port, a digital input port, and a digital output port, the TOF processor comprising a phase detector including cyclically rotating demultiplexer (DE-MUX), a first summer coupled to a first DEMUX output, a second summer coupled to a second DEMUX output, a third summer coupled to a third DEMUX output, a fourth summer coupled to a fourth DEMUX output, and a phase estimator coupled to outputs of the first summer, the second summer, the third summer and the fourth summer and having a phase estimate output; a driver having a digital driver port coupled to the digital TOF port and a driver output port; and an analog-to-digital converter (ADC) having an output port coupled to the digital input port of the digital TOF processor.

19 Claims, 7 Drawing Sheets

(56) References Cited

U.S. PATENT DOCUMENTS

| | | |
|---|---|---|
| 9,176,588 B2 | 11/2015 | Veygman |
| 9,229,581 B2 | 1/2016 | Skurnik et al. |
| 9,342,159 B2 | 5/2016 | Veygman |
| 9,348,462 B2 | 5/2016 | Wen |
| 9,349,035 B1 | 5/2016 | Gerber et al. |
| 9,367,119 B2 | 6/2016 | Sala et al. |
| 9,391,607 B2 | 7/2016 | Joharapurkar et al. |
| 9,431,440 B2 | 8/2016 | Souchkov |
| 9,472,696 B1 | 10/2016 | Kerness et al. |
| 9,582,078 B1 | 2/2017 | Veygman et al. |
| 9,702,970 B2 | 7/2017 | Pahlavan et al. |
| 9,766,710 B2 | 9/2017 | Kettle |
| 9,778,099 B2 | 10/2017 | Allen et al. |
| 2009/0079959 A1* | 3/2009 | Masuda ............... G01S 7/493 356/5.1 |
| 2011/0261008 A1 | 10/2011 | Joharapurkar et al. |
| 2012/0187280 A1 | 7/2012 | Kerness et al. |
| 2013/0162586 A1 | 6/2013 | Erdogan et al. |
| 2013/0335225 A1 | 12/2013 | Wen |
| 2014/0124797 A1 | 5/2014 | Jones et al. |
| 2014/0198025 A1 | 7/2014 | Veygman |
| 2014/0319326 A1 | 10/2014 | Tanase |
| 2015/0048851 A1 | 2/2015 | Erdogan et al. |
| 2015/0174342 A1 | 6/2015 | Mitrosky et al. |
| 2015/0293615 A1 | 10/2015 | Gerber et al. |
| 2016/0018948 A1 | 1/2016 | Parvarandeh et al. |
| 2016/0291797 A1 | 10/2016 | Joharapurkar et al. |
| 2017/0205948 A1 | 7/2017 | Erdogan et al. |
| 2019/0018138 A1 | 1/2019 | Warke et al. |
| 2019/0064340 A1 | 2/2019 | Kim et al. |

\* cited by examiner

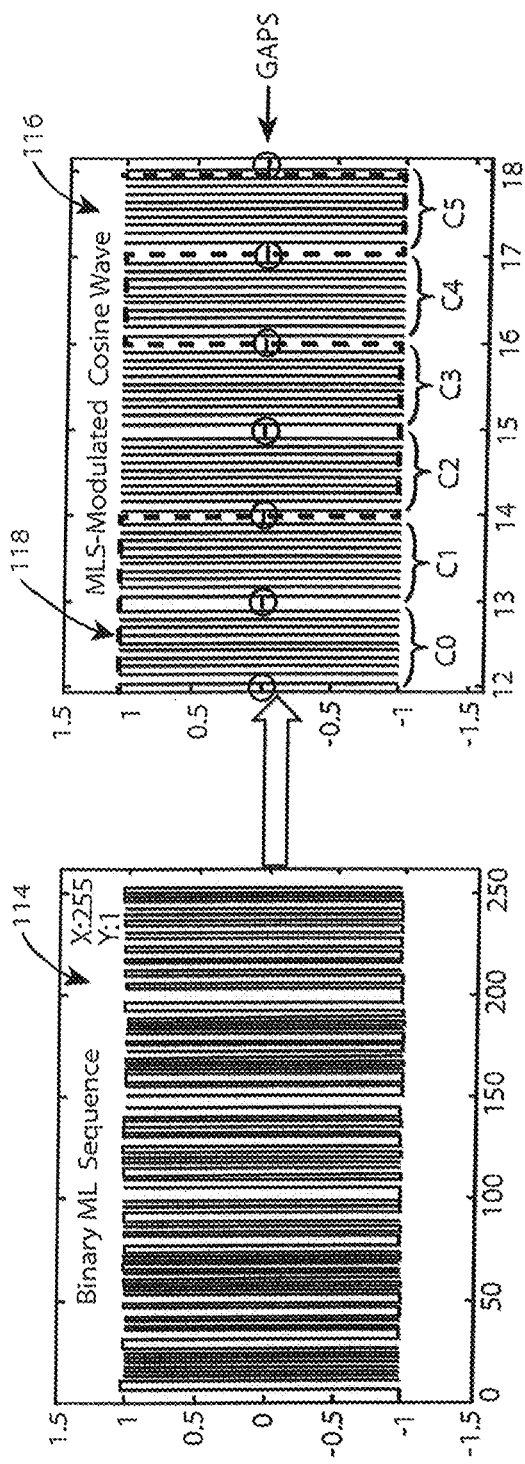
Fig. 8A
Fig. 8B
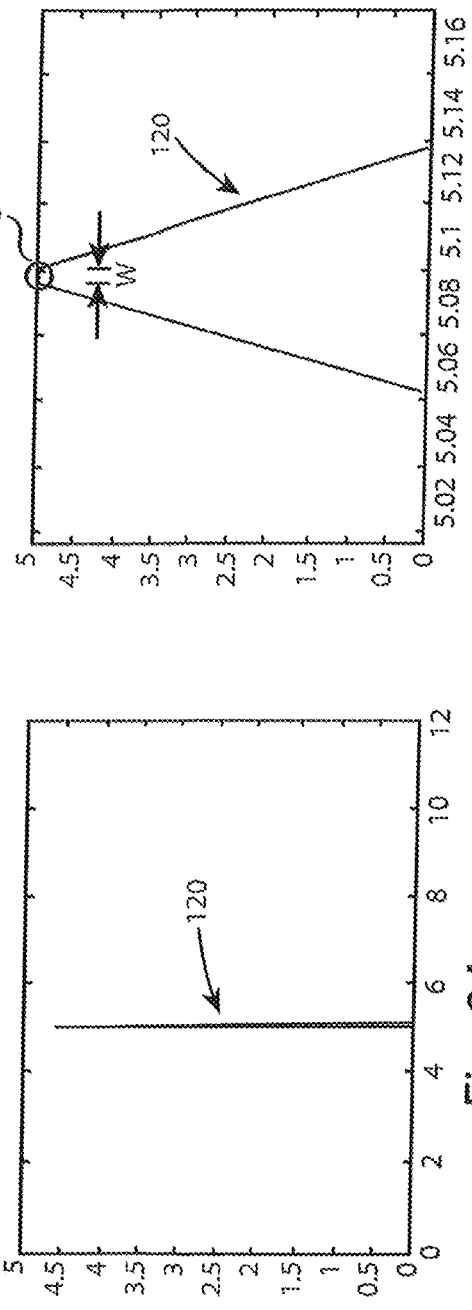
Fig. 9A
Fig. 9B

TIME OF FLIGHT SENSORS AND SENSING METHODS

CROSS REFERENCE TO RELATED APPLICATION(S)

This application claims the benefit of U.S. Provisional Patent Application Ser. No. 62/712,952, filed Jul. 31, 2018, incorporated herein by reference.

BACKGROUND

Time of flight (TOF) is a property of an object, particle or wave (e.g. acoustic or electronic wave) related to how long it takes it to travel through a medium. TOF technology can be used for a variety of purposes, including range-finding and 3D imaging.

3D Time-of-Flight (TOF) technology is revolutionizing the machine vision industry by providing 3D imaging using a low-cost CMOS pixel array together with an active modulated light source. Compact construction, easy-of-use, together with high accuracy and frame-rate makes TOF cameras an attractive solution for a wide range of applications such as computer vision, drones and robotic applications.

A 3D time-of-flight (TOF) camera works by illuminating the scene with a modulated light source, and observing the reflected light. The phase shift between the illumination and the reflection is measured and translated to distance. Typically, the illumination is from a solid-state laser or a LED operating in the near-infrared range (~850 nm) invisible to the human eyes. An imaging sensor designed to respond to the same spectrum receives the light and converts the photonic energy to electrical current. Note that the light entering the sensor has an ambient component and a reflected component. Distance (depth) information is only embedded in the reflected component. Therefore, high ambient component reduces the signal to noise ratio (SNR).

To detect phase shifts between the illumination and the reflection, the light source is pulsed or modulated by a continuous-wave (CW), source, typically a sinusoid or square wave. Square wave modulation is more common because it can be easily realized using digital circuits. However, sinusoidal waves can result in less distortion.

The pulsed method is straightforward. The light source illuminates for a brief period ($\Delta t$), and the reflected energy is sampled at every pixel, in parallel, using two out-of-phase windows, C1 and C2, with the same $\Delta t$. Electrical charges accumulated during these samples, Q1 and Q2, are measured and used to compute distance. In contrast, the CW method takes multiple samples per measurement, e.g. usually at least four samples per period of the modulation frequency. Using this technique, the phase angle between illumination and reflection, $\varphi$, and the distance, d, to an object can be calculated.

The fact that the CW measurement is based on phase, which wraps around every $2n$ ("phase-wrapping"), means that the distance will also have an aliasing distance. The distance where aliasing occurs is called the ambiguity distance (damb). Since the distance wraps, damb is also the maximum measurable distance. Previously, if one wished to extend the measurable distance, the modulation frequency had to be reduced, reducing the accuracy of the distance measurement.

There are TOF systems on the market utilizing the aforementioned processes. However, prior art TOF systems are not integrated solutions and typically involve several general-purpose components that are programmed with firmware and software to take TOF measurements, such that depth and 3D data can be derived. Such systems tend to be bulky and expensive.

Additionally, due to light source and sampling constraints on the detector of previous TOF sensors, square wave signals are typically employed, which result in greater ambiguity and depth error.

Due to phase wrapping, there has also been a trade-off between range of distance measurement and accuracy of measurement. Phase wrapping refers to the distance at which the reflected signal from the object is ambiguous. An approach for high accuracy requires high frequency modulation, yet high frequency modulation limits the range at which objects can be detected.

When making TOF measurements based upon reflected waves, there is the possibility of interferences from other lights sources with periodic modulation. These other light sources may be unrelated to the TOF sensor or may be other TOF sensors operating in the same physical space. Particularly problematical are other TOF sensors operating in the same physical space, since detected light might be direct light from the other TOF sensors.

These and other limitations of the prior art will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 8A is a graph illustrating an MLS signal;

FIG. 8B is a graph illustrating an MLS-modulated cosine wave; and

FIGS. 9A and 9B are graphs of an MLS-modulated cosine wave pulse.

DETAILED DESCRIPTION OF EXAMPLE EMBODIMENTS

Figure 1:
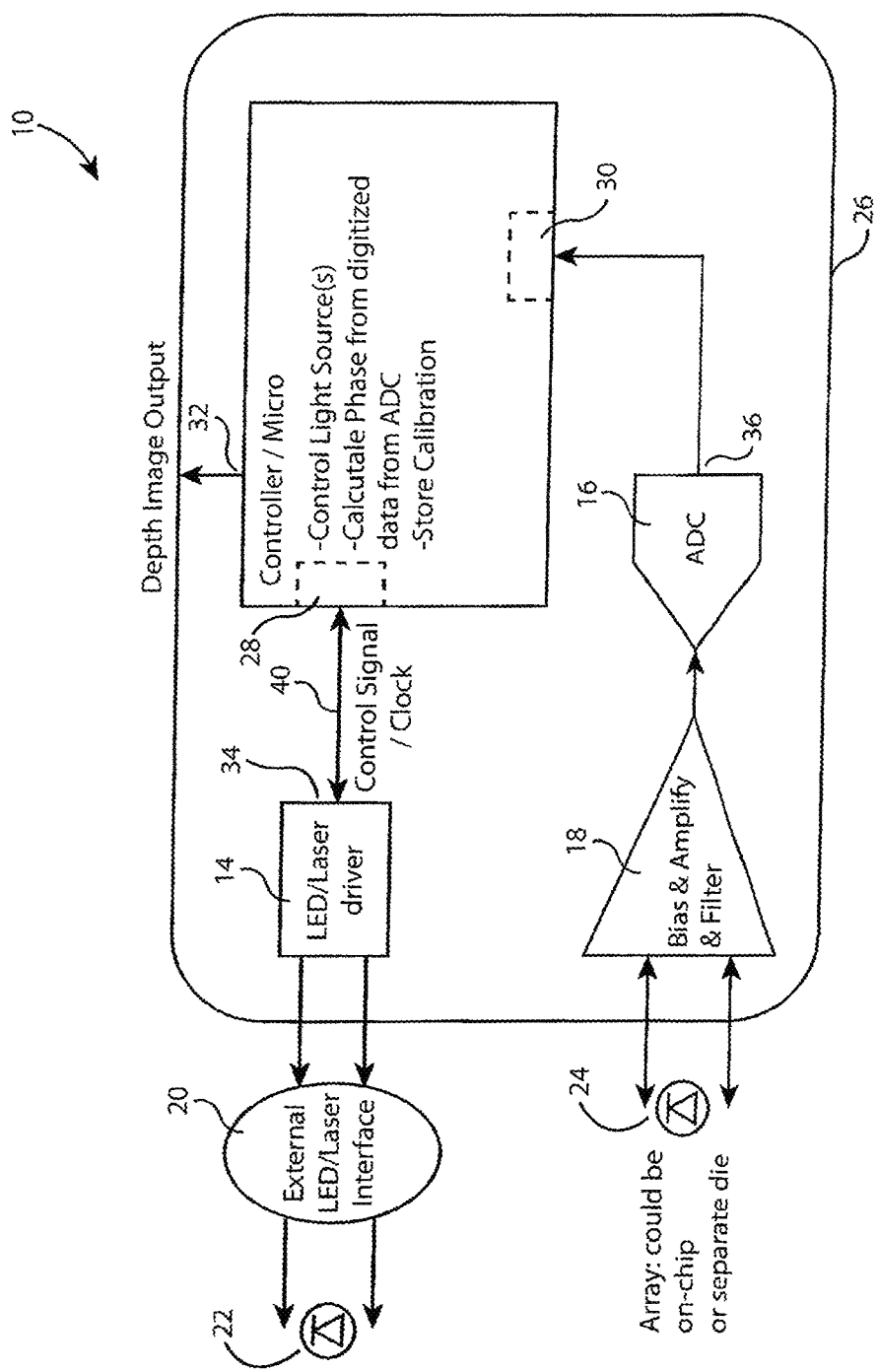
FIG. 1 is a block diagram of a first example embodiment of a time of flight (TOF) sensor.

In FIG. 1, a time of flight (TOF) sensor 10, set forth by way of example and not limitation, includes TOF processor 12, a driver 14, an analog-to-digital converter (ADC) 16 and a signal conditioner 18. In certain embodiments, time of flight sensor 10 is coupled to, or further includes, an interface 20, a waveform transmitter 22, and a waveform receiver 24. For example, the interface 20 can be an external light emitting diode (LED) or laser interface, waveform transmitter can be an LED or laser, and waveform receiver 24 can be a photodetector device. In an example embodiment, the time of flight sensor 10 is implemented as an integrated circuit 26. Other components, such as interface 20, waveform transmitter 22, and/or waveform receiver 24 can also be implemented as part of the integrated circuit 26.

The TOF processor 12 includes a digital TOF port 28, a digital input port 30 and a digital output port 32. Driver 14 includes a digital driver port 34 coupled to the digital TOF port 28 of the TOF processor 12. ADC 16 has on output port 36 coupled to the digital input port of the digital TOF processor. Signal conditioner 18 couples waveform receiver 24 to an input of ADC 16. Interface 20 couples the driver 14 to the waveform transmitter 22. It should be noted that the TOF processor 12 can serve as a correlator having a correlated waveform (e.g. derived from a reflected waveform) as one input.

It will be appreciated that, in this example embodiment, the integrated circuit 26 provides a control signal 40 to drive (or modulate) a light source 22. The control signal 40 is preferably coupled to additional driving electronics (e.g. FETs or MOSFETs) of the driver 14 to increase power to the light source (LED, laser diodes, etc.) or it can independently provide electrical power to drive the light source 22.

The control signal 40 generates a clock can be used to determine a phase difference between the calculation of a phase difference between a modulated waveform transmitted by light source 22 and a reflected waveform received by photodetector device 24. By way of non-limiting examples, photodetector device 24 can be a Single Photon Avalanche Diode (SPAD), a Silicon Photomultiplier (SiPM), silicon photodiodes, III-V photodiodes, photoconductors, etc. In certain embodiments, the photodetector device 24 can be an array of photodetectors capable of producing an image. The photodetector device 24 can be associated with a lens or lens barrel (not shown) to enhance light collection and to facilitate the creation of creating an image of the scene or objects/targets like a normal camera system. The photodiodes are read by electronics in the sensor system individually. The readout can include a low-noise amplifier and a filter. The readout can also provide necessary reverse bias voltage. After gain and amplification and filtering the signal is sampled and digitized by a fast ADC and data in sent to a circuitry to do the computation. The block diagram of the controller/micro that does this computation is shown in FIG. 2, photodiode and readout are shown again for making referencing easier.

Figure 2:
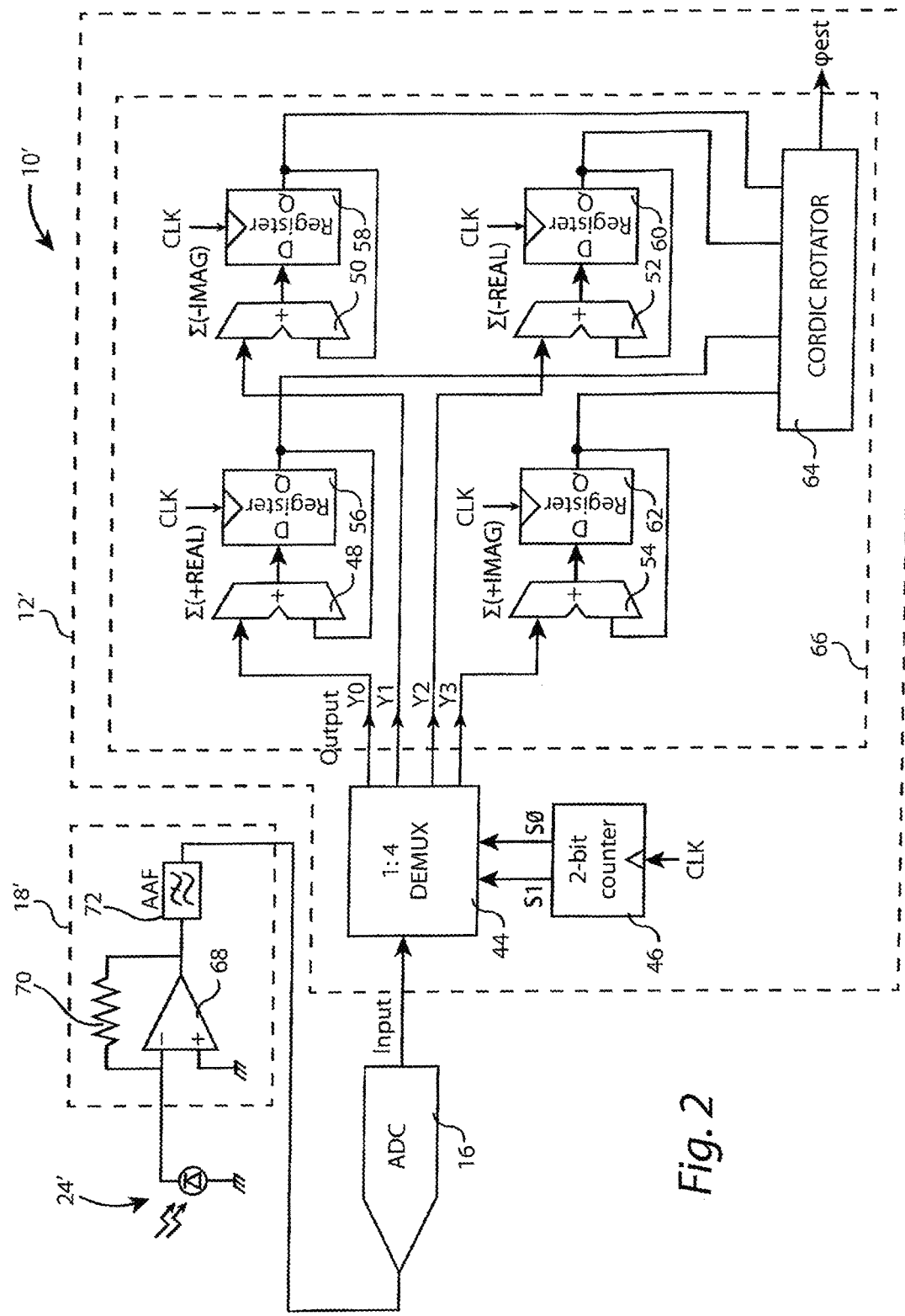
FIG. 2 is a block diagram of a second example embodiment of a TOF sensor.

In FIG. 2, a TOF sensor 10', set forth by way of example and not limitation, includes a TOF processor 12', an ADC 16, and a signal conditioner 18', where like reference numbers refer to like components. The TOF processor 12', in this non-limiting example, includes a demultiplexer (DMUX) 44, a counter 46, a first summer 48, a second summer 50, a third summer 52, a fourth summer 54, a first clocked register 56, a second clocked register 58, a third clocked register 60, a fourth clocked register 62 and a CORDIC Rotator 64. Collectively, the summers 48-54, the clocked registers 56-62, and the CORDIC Rotator 64 comprise a phase estimator 66.

DEMUX 44 is, in this example, a 1:$2^n$ (1:4) demultiplexer, where n=2. Therefore, DEMUX 44 is a n-bit (2-bit) controlled demultiplexer comprising two control ports S0 and S1, a first DEMUX output Y0, a second DEMUX output Y1, a third DEMUX output Y2, and a fourth DEMUX output Y3. Counter 46 is, in this example, a 2-bit counter having a clock input CLK and outputs S0 and S1. ADC 16 operates similarly to the like component of FIG. 1, and signal conditioner 18' includes an operational amplifier (OPAMP) 68 with a feedback resistor 70 and a filter 72, such as an anti-aliasing filter (AAF).

As noted above, the phase estimator 66 includes summers 48-54, clocked registers 56-62, and CORDIC Rotator 64. In this non-limiting example, first DEMUX output Y0 is coupled to an input of first summer 48, second DEMUX output Y1 is coupled to an input of second summer 50, third DEMUX output Y2 is coupled to an input of third summer 52, and fourth DEMUX output Y3 is coupled to an input of fourth summer 54. In this example, first summer 48 sums the positive real portion ($\Sigma$+REAL) of the demultiplexed signal, second summer 50 sums the negative imaginary portion ($\Sigma$−IMAG) of the demultiplexed signal, third summer 52 sums the negative real portion ($\Sigma$−REAL) of the demultiplexed signal, and fourth summer 54 sums the positive imaginary portion ($\Sigma$−IMAG) of the demultiplexed signal. Registers 56-62 latch the summation values of summers 48-54, respectively, for each clock cycle of system clock CLK.

It should be noted that the CORDIC Rotator 64 is only one example of a phase estimator. Other examples of phase estimators include polynomial approximations to the arctangent function, or look-up table approximations to the arctangent function followed by linear interpolation. See, for example, Ukil, Abhisek & Shah, Vishal & Deck, Bernhard. (2011). Fast computation of arctangent functions for embedded applications: A comparative analysis. 10.1109/ISIE.2011.5984330 and P. Markstein, "A fast-start method for computing the inverse tangent," 17th IEEE Symposium on Computer Arithmetic (ARITH'05), 2005, pp. 266-271, all of which are incorporated herein by reference. In this non-limiting example, CORDIC ROTATOR 64 digitally implements Volder's algorithm as a CORDIC (Coordinate Rotation Digital Computer) algorithm to efficiently calculate hyperbolic and trigonometric functions. CORDIC is an example of digit-by-digit algorithms, which iteratively converge on an answer by processing digit (or bit) per iteration. CORDIC is closely related to methods known as pseudo-multiplication and pseudo-division when no hardware multiplier is available. The only operations required to converge on an answer are addition, subtraction, bitshift and table lookup. Therefore, CORDIC algorithms belong to the class of shift-and-add algorithms. The design and manufacture of CORDIC Rotators are well known to those of skill in the art.

Example CORDIC algorithms implemented by CORDIC Rotator 64 can be explained as follows. Assume a received signal current contains a sinusoid component of known frequency but unknown phase, $\varphi$ $$I(t)=A_0\{1+m\cdot\cos(2\pi f_m t+\varphi)\}+N(t), 0\le m\le 1$$

Where I(t) is analog signal from amplifier and filter with $A_0$ DC level, and m is ratio of amplitude of AC signal to the DC level.

If there is a reference signal (e.g., the control signal to the LED, or electric signal from oscillator modulating light source), then $$R(t)=\exp(2\pi i f_m t)$$

and the phase can be calculated as:

$$\hat\varphi = \angle\left\{\int_{t=0}^{K/f_m} R^*(t)\cdot I(t)\cdot dt\right\}, K\in\mathbb{N}$$

It can be understood that the higher value of K means a longer integration time that improves signal to noise ratio SNR and improves accuracy of calculating φ, in presence of Noise; N(t). Assuming that the ADC samples the incoming signal I(t) from the detectors with a frequency of $f_s=4f_m$, then $$I(k) = A_0\left\{1 + m \cdot \cos\left(2\pi f_m \frac{k}{f_s} + \varphi\right)\right\} + N\left(\frac{k}{f_s}\right),$$

$$0 \leq m \leq 1 = A_0\left\{1 + m \cdot \cos\left(\frac{\pi k}{2} + \varphi\right)\right\} + N\left(\frac{k}{f_s}\right)$$

where the reference signal is $$R^*(k) = \exp\left(\frac{-\pi i k}{2}\right) = i^{-k}$$

and the phase shift of the reflected signal relative to the transmitted (reference) signal is as follows:

$$\hat{\varphi} = \angle\left\{\sum_{k=0}^{4K-1} R^*(k) \cdot I(k)\right\} = \angle\left\{\sum_{k=0}^{4K-1} i^{-k} I(k)\right\}$$

It will be noted that factorizing the calculation into 4 discrete summations to removes the need for multiplications in the correlation process. The mathematics behind the algorithm for efficiently performing complex correlation is therefore as follows:

$$\hat{\varphi} = \angle\left\{\left[\sum_{K=0}^{N-1} R(4K) - \sum_{K=0}^{N-1} R(4K+2)\right] + i\left[\sum_{K=0}^{N-1} R(4K+3) - \sum_{K=0}^{N-1} R(4K+1)\right]\right\}$$

Or $$\hat{\varphi} = \angle\left\{\sum_{K=0}^{N-1} R(4K) - R(4K+2) + i\sum_{K=0}^{N-1} R(4K+3) - R(4K+1)\right\}$$

It will be noted that by choosing $f_s=4f_m$, the need for any multiplication in the CORDIC Rotator 64 has been eliminated. The arithmetic complexity is reduced to one real accumulation per sample per pixel and one 4-quadrant arctangent per correlation interval per pixel, which can be implemented using CORDIC, by way of non-limiting example).

The maximum depth of distance that can be unambiguously detected can be written as $$d_{max} = \frac{c}{2fm},$$

where c is speed of light and $f_m$ is the modulating frequency. After $d_{max}$ the phase would repeat again, in a phenomenon known as "phase-wrapping", and potentially resulting in ambiguous values.

In this example, the standard deviation of the estimation error is bound as follows:

$$\sigma_t^2 \geq \frac{1}{N \times SNR \times (2\pi f)^2}$$

Where N is number of samples that the ADC reads for each calculation period or integration time (e.g., the number of samples that are added together to do the calculation of phase as set forth above). SNR is signal to noise ratio for one of those readings and f is the frequency of modulation. It will be noted that the higher the frequency, the lower the error in estimating time of flight. However, however, $d_{max}$ also reduces, due to phase-wrapping.

Figure 3:
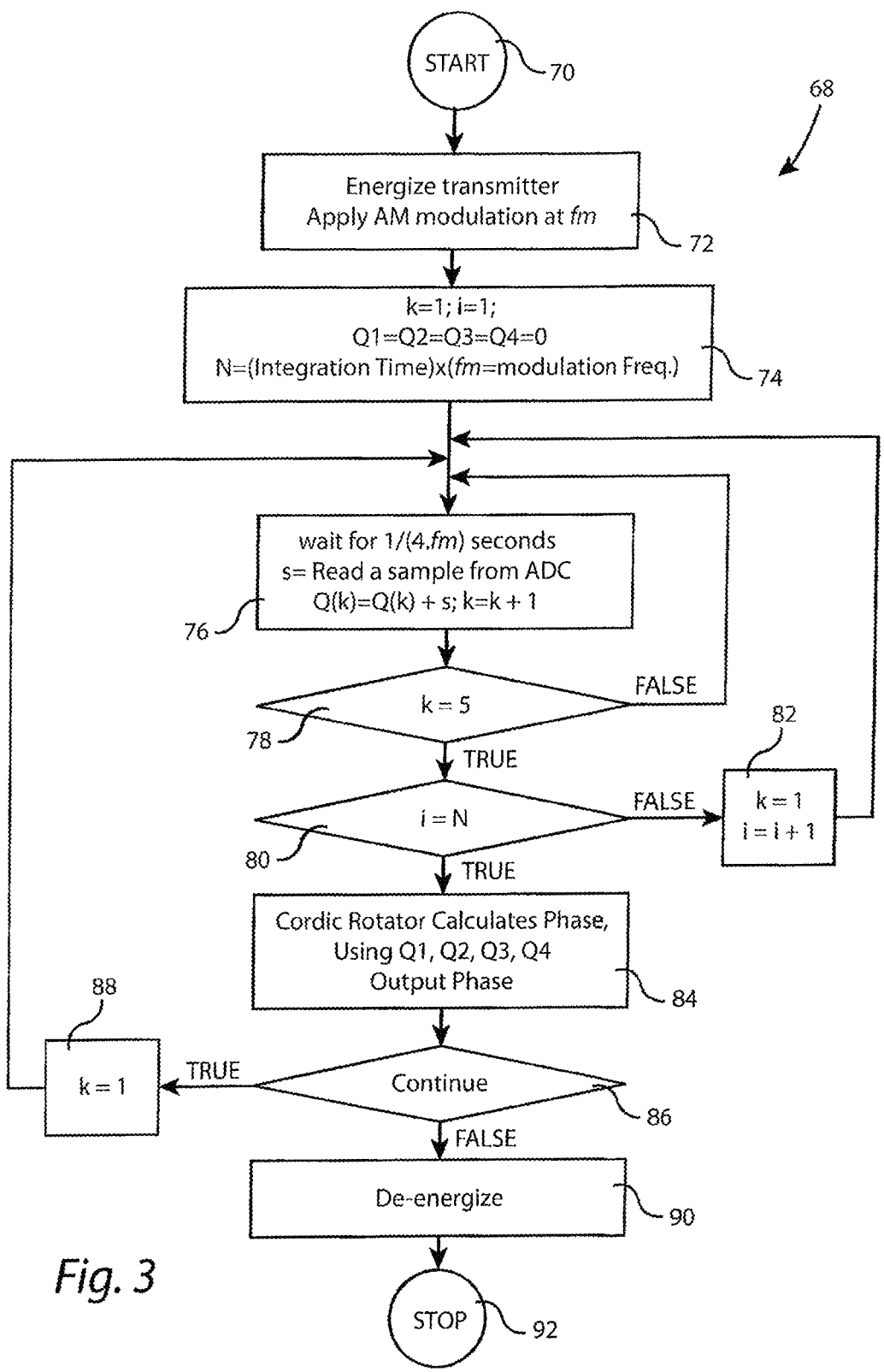
FIG. 3 is a flow diagram of a method for operating a TOF sensor.

FIG. 3 is a flow diagram 68 of an example process employing complex correlation and CORDIC derotation to estimate phase. Process 68 begins at operation 70 and, in an operation 72, the transmitter (e.g. LED 24') is energized with an amplitude modulation (AM) at $f_m$. Next, in a operation 74, variables are initialized. In an operation 76, there is a wait period of $1/(4*f_m)$ seconds before reading a sample s from the ADC, adding the sample s to Q(k), and incrementing k by one. Next, in an operation 78, it is determined if k=5 and, if not, operation 76 is repeated. If k does equal 5 (e.g., operation 76 has been implemented 4 times in the $i^{th}$ iteration), an operation determines if the variable i is equal to the variable N. If not, the variable k is set to 1 and the variable I is incremented before returning process control to operation 76. After i is equal to N, an operation 84 calculates an estimated phase, using Q1, Q2, Q3 and Q4, and outputs the estimated phase. Next, an operation 86 determines if the process 68 is to be continued and, if so, the variable k is reset to 1 and process control returns to operation 76. If the process 68 is not to be continued, the apparatus is de-energized in an operation 90 and the process 68 ends in an operation 92.

Figure 4:
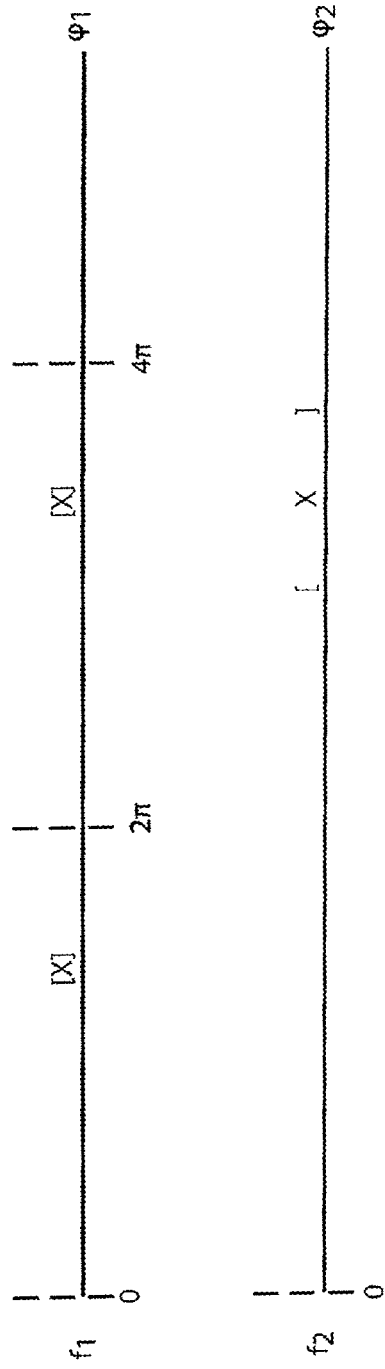
FIG. 4 is a graph illustrating an operation of a TOF sensor at a first frequency $f_1$ and a second frequency $f_2$.

FIG. 4 is a graph illustrating an example embodiment which uses a two modulation frequencies, for example $f_1$=10 MHz and $f_2$=1 MHz. With the lower frequency modulation $f_2$ we can first calculate position of the phase and get an estimate of time-of-flight TOF, and from the higher frequency modulation $f_1$, we would get the more accurate estimation of TOF within the specific range determined by the first frequency. As can be seen, at the higher frequency $f_1$ the TOF [X] angle $\varphi_1$ repeats every $2\pi$, but with good resolution, while with the lower frequency $f_2$ the TOF [X] angle $\varphi_2$ does not repeat before it aligns with the second TOF [X]. In this example, the "X" designates the TOF spot, while the width of the brackets "[ ]" designates the accuracy range of the measurement. In other words, the lower frequency modulation $f_2$ can be used to remove the ambiguity resulted from the phase-wrapping and the higher frequency modulation $f_1$ can be used to increase the accuracy of the estimate.

Figure 5:
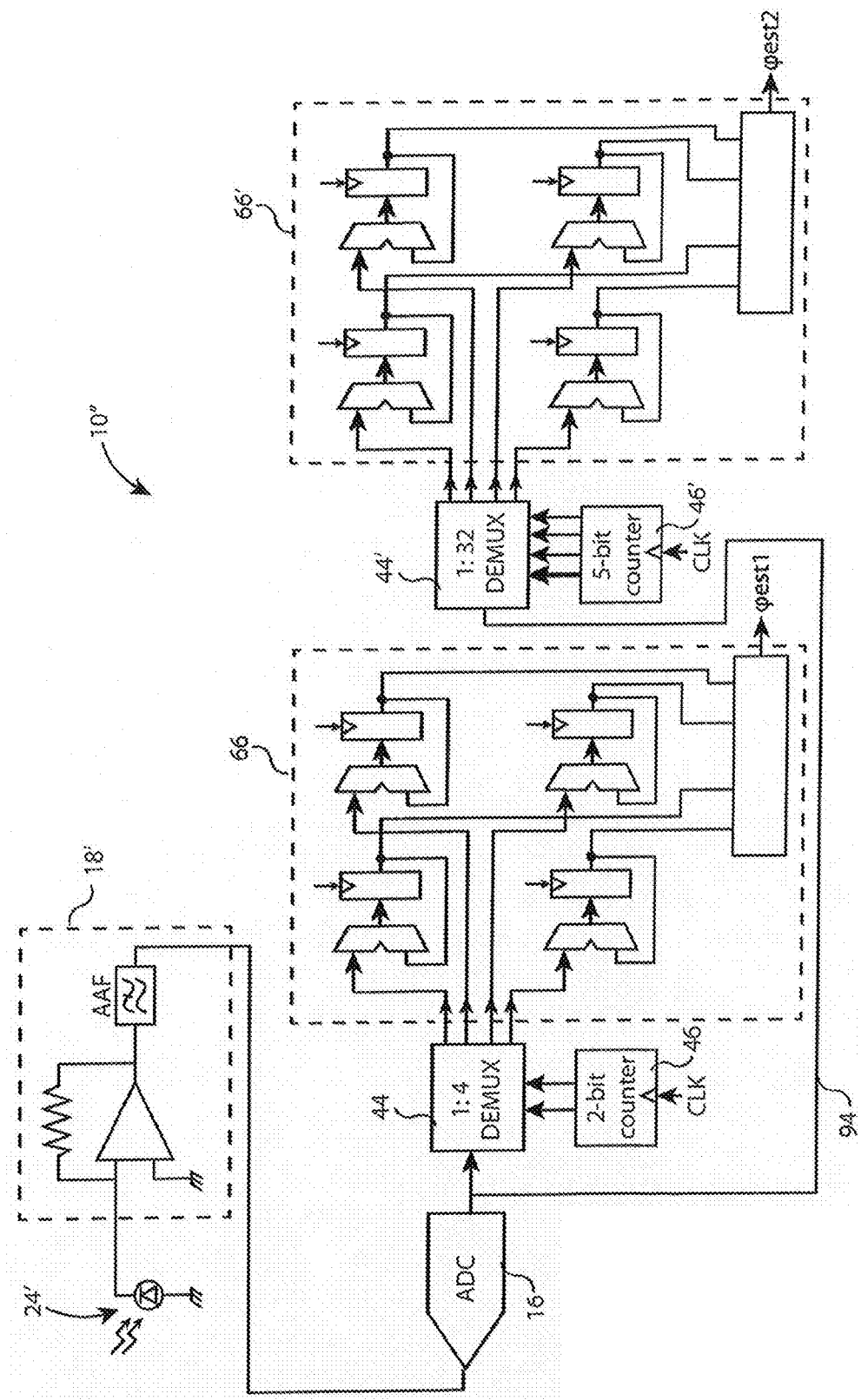
FIG. 5 is a block diagram of a third example embodiment of a TOF sensor.

FIG. 5 is a block diagram of a TOF sensor 10", set forth by way of example and not limitation, which can be used to resolve phase-wrapping ambiguities while maintaining high resolution. TOF sensor 10" includes the TOF sensor 10' of FIG. 3, to which a DEMUX 44', counter 46', and phase estimator 66' has been added. Therefore, in this example embodiment, two phase estimates are developed by TOF sensor 10", namely $\varphi_{est1}$ by phase estimator 66 and $\varphi_{est2}$ by phase estimator 66'. The construction and operation of phase estimator 66 and phase estimator 66' are substantially the same. It will therefore be appreciated that two, simultaneous modulation frequencies are detected by means of harmonically-related, multiplier-free correlators in this example embodiment.

DEMUX 44', in this non-limiting example, is a n-bit (5-bit) controlled demultiplexer, where n=5, having its signal input coupled to the ADC 16 by a line 94. DEMUX 44' is therefore a $1:2^n$ (1:32) demultiplexer. Therefore, DEMUX 44' has 32 outputs, of which only four are used. That is, a first DEMUX output Y0, a second DEMUX output Y8, a third DEMUX output Y16, and a fourth DEMUX output Y24. Counter 46 is, in this example, a 5-bit counter having a clock input CLK and outputs coupled to 5 control ports of the DEMUX 44'. Since the clock rates for counter 46 and counter 46' are the same, it will be appreciated that the frequency of the signal input into phase estimator 66 is 8 times faster than the frequency of the signal input into phase estimator 66'. This is because only every eighth output of DEMUX 44' is used.

It should be noted that TOF sensor 10" can be used to deliver optimal spatial resolution performance. The reference or range finder modulated frequency detects an object in the scene and the second signals modulation frequency is automatically or programmatically adjusted to a frequency that delivers the highest spatial resolution with no phase-wrapping.

In example embodiments, a sinusoidal waveform is modulated by a binary code comprising a plurality of chips ("bits") and having an impulse-like cyclic autocorrelation. As will be appreciated by those of skill in the art, such binary codes can be of a variety of types, including maximal length sequence (MLS), Kasami codes, and Gold codes. As used herein, a "chip" can be used interchangeably with "bits", and "impulse-like" is defined as and means that the peak autocorrelation sidelobes (PSL) of the signal are substantially suppressed, e.g. do not exceed $\frac{1}{16}$ the length of the sequence. More particularly, "impulse-like", as used herein, means that the PSL of the signal can be from zero (a pure impulse) up to a relatively small fraction of the length of the sequence, e.g. $\frac{1}{32}^{th}$ of the length of the sequence, $\frac{1}{16}^{th}$ of the length of the sequence, or $\frac{1}{8}^{th}$ of the length of the sequence, etc., depending upon the application. Those of skill in the art will realize that this definition of "impulse-like" correlates with a binary code having a cyclic autocorrelation function that closely approximates a Dirac delta function. By way of non-limiting example, an MLS binary code comprising a plurality of chips and having an impulse-like cyclic autocorrelation will be discussed in greater detail.

Figure 6:
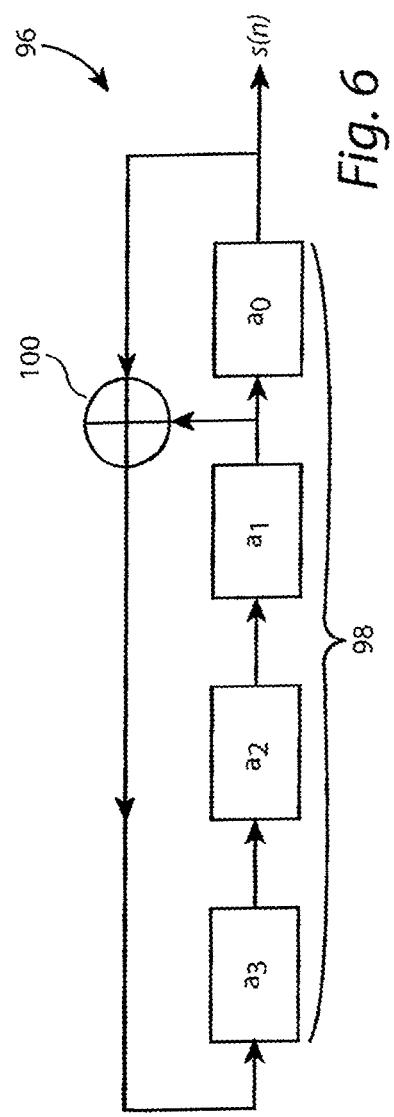
FIG. 6 is a block diagram of a maximal length sequence (MLS) generator.

In FIG. 6, a maximal length sequence (MLS) generator 96 include a maximal linear feedback shift register 98 and a modulo-2 adder 100. In this example, shift register 98 has a length of 4. With this example embodiment, the next value in register $a_3$ is determined by the modulo-2 sum of $a_0$ and $a_1$. The MLS generator 96 recursively generates pseudorandom binary (MLS) sequences, which can be used for the purpose of disambiguation.

The circular autocorrelation of an MLS is a Kronecker delta function, with DC offset and time delay depending upon its implementation. For a ±1 convention:

$$R(n) = \frac{1}{N} \sum_{m=1}^{N} s[m]s^*[m+n]N = \begin{cases} 1 & \text{if } n = 0, \\ -\frac{1}{N} & \text{if } 0 < n < N. \end{cases}$$

where s* represents the complex conjugate and $[m+n]_N$ represents a circular shift.

Figure 7:
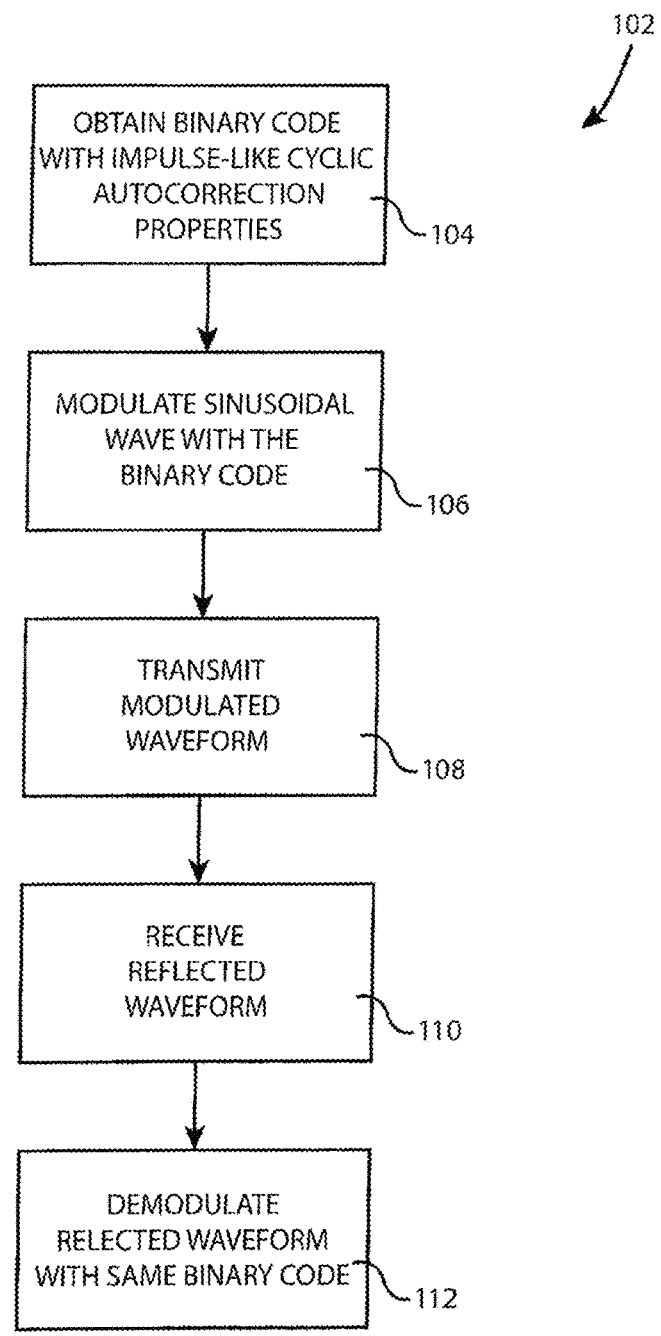
FIG. 7 is a flow diagram of a method for distinguishing a phase-shifted reflected waveform of a transmitted waveform from other waveforms.

FIG. 7 is a flow diagram of a method 102, set forth by way of example and not limitation, for distinguishing a phase-shifted reflected waveform of a transmitted waveform from other waveforms. In an operation 104, a binary code with impulse-like cyclic autocorrelation properties is obtained, e.g. from MLS generator 96, from a look-up table, etc. Next, in an operation 106, a sinusoidal (e.g. cosine) wave is modulated by the binary code to form a series of bits ("chips") on a sinusoidal carrier wave. Optionally, gaps are provided between adjacent chips in this operation 106, as will be discussed in greater detail subsequently. The modulated waveform is then transmitted as a transmitted waveform, e.g. from an LED or laser diode in an operation 108. Next, in an operation 110, a reflected waveform is received, e.g. by a photodetector, and is demodulated in an operation 112 using the same binary code that was used to create the transmitted waveform. This operation 112 may optionally provide gaps between adjacent chips (either instead of or in conjunction with operation 106) before recovering the original signal of the transmitted waveform. For example, a signal gap is provided between adjacent chips in a correlation signal (e.g. the binary code used to modulate the modulated waveform) to accommodate sign changes with timing uncertainty in the reflected waveform The processes of operation 106 of FIG. 7 will be discussed in greater detail with respect to FIGS. 8A, 8B, 9A and 9B. FIG. 8A illustrates an MLS signal that is used to MLS-modulate a cosine wave into a number of bits or "chips" C, e.g. C0, C1 . . . C5 . . . , as seen in FIG. 8B. In another example embodiment, there are 255 chips in the sequence. The chips C can have a value of +1 or −1. That is, for each positive chip there is a positive burst of cosine waves, and for each negative chip there is a negative burst of cosine waves. These bursts of cosine waves can be demodulated by a phase detector into positive and negative pulses 118. In this example, the pulses make the sequence +1, +1, −1, −1, +1, −1, +1.

As seen in FIG. 8B, optionally between each chip C is a gap where the value is zero, e.g. the signal ceases for a short period of time, to accommodate sign changes with timing uncertainty. That is, if a receiver of the modulated cosine wave attempts to read the signal as the sign changed between two chips, a decoding error might occur. By providing a gap between each chip, this embodiment prevents bit errors occurring between chips that are changing signs by providing a buffer zone between adjacent chips. While this technique may reduce the signal strength of the modulated cosine wave 116 somewhat, this is more than offset by the reduction in errors that occur during sign changes between chips. It should be noted that the gaps between chips C can be provide before transmission, e.g. in the transmitted waveform, or after the reflected waveform is received. In either event, a correlation waveform (e.g. as illustrated in FIG. 8B) a comprising a binary code having impulse-like cyclic autocorrelation properties and optional gaps between adjacent chips is provided as one input to the correlator.

FIG. 9A is a graph of an MLS-modulated cosine wave 120, and FIG. 9B is a zoomed in version of the MLS-modulated cosine wave 120 to show the gap "G" at the apex of the waveform. The width "W" of the gap is preferably sufficient to overcome any timing uncertainties during sign changes, and represents only phase information, not amplitude.

It should be noted that the benefit of the gaps can be realized either by transmitting a signal with the gaps already included or by transmitting an uninterrupted modulated transmitted waveform and inserting equivalent gaps in the received reflected waveform. In either event, a correlation waveform (e.g. as illustrated in FIG. 8B) forms on input to the correlator. Since correlation is essentially the integration of the product of two signals, it doesn't matter whether the multiplier or the multiplicand is zero, since the result will be zero in either case.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A time of flight sensor comprising:
a time of flight (TOF) processor having a digital TOF port, a digital input port, and a digital output port, the TOF processor comprising a phase detector including a cyclically rotating demultiplexer (DEMUX), a first summer coupled to a first DEMUX output, a second summer coupled to a second DEMUX output, a third summer coupled to a third DEMUX output, a fourth summer coupled to a fourth DEMUX output, and a phase estimator coupled to outputs of the first summer, the second summer, the third summer and the fourth summer and having a phase estimate output;
a driver having a digital driver port coupled to the digital TOF port and a driver output port; and
an analog-to-digital converter (ADC) having an output port coupled to the digital input port of the digital TOF processor.

2. A time of flight sensor as recited in claim 1 further comprising a waveform transmitter coupled to the driver output port and a waveform receiver having an output port that is coupled to an input port of the ADC.

3. A time of flight sensor as recited in claim 2 further comprising a signal conditioner coupling the waveform receiver to the input port of the ADC.

4. A time of flight sensor as recited in claim 3 wherein the signal conditioner includes one or more of a biasing circuit, an amplifier and a filter.

5. A time of flight sensor as recited in claim 4 wherein the waveform transmitter comprises at least one of a light emitting diode (LED) and a laser, whereby the modulated waveform is a modulated electromagnetic waveform.

6. A time of flight sensor as recited in claim 5 further comprising a first clocked register coupled to the first summer, a second clocked register coupled to the second summer, a third clocked register coupled to the third summer, and a fourth clocked register coupled to the fourth summer.

7. A time of flight sensor as recited in claim 6 wherein the first clocked register, the second clocked register, the third clocked register, and the fourth clocked register couple the first summer, the second summer, the third summer and the fourth summer to the phase estimator.

8. A time of flight sensor as recited in claim 1 further comprising a clocked counter coupled to control ports of the DEMUX.

9. A time of flight sensor as recited in claim 8 wherein the DEMUX is a 1:4 demultiplexer and the clocked counter is a 2-bit counter.

10. A time of flight sensor as recited in claim 9 wherein the clocked counter, the first clocked register, the second clock register, the third clocked register and the fourth clocked register are clocked are synchronously clocked.

11. A time of flight sensor as recited in claim 1 wherein the TOF processor is implemented as an application specific integrated circuit (ASIC).

12. A time of flight sensor as recited in claim 1 wherein the TOF processor is a first TOF processor having an n-bit controlled first DEMUX, and further comprising a second TOF processor with a m-bit controlled second DEMUX, where m>n, whereby the first TOF processor develops a first phase estimate output and the second TOF processor develops a second phase estimate output.

13. A time of flight sensor as recited in claim 12 further comprising a clocked n-bit counter coupled to the first TOF processor and a clocked m-bit counter coupled to the second TOF processor.

14. A time of flight sensor as recited in claim 13 wherein the first DEMUX is a $1:2^n$ demultiplexer and the second DEMUX is a $1:2^{5n}$ demultiplexer.

15. A time of flight sensor as recited in claim 1 wherein the digital TOF port develops a signal for the driver comprising a modulated waveform formed from a binary code comprising a plurality of chips and having an impulse-like cyclic autocorrelation that modulates a sinusoidal waveform, wherein a signal gap is provided between adjacent chips to accommodate sign changes with timing uncertainty.

16. A time of flight sensor as recited in claim 15 wherein the binary code is a maximum length sequence (MLS).

17. A time of flight sensor as recited in claim 1 wherein the phase estimator comprises a Coordinate Rotation Digital Computer (CORDIC) Rotator.

18. A time of flight sensor as recited in claim 1 wherein the digital input port receives a reflected waveform of a modulated waveform formed from a binary code comprising a plurality of chips and having an impulse-like cyclic autocorrelation that modulates a sinusoidal wave, wherein the TOF processor provides a signal gap between adjacent chips of the reflected waveform to accommodate sign changes with timing uncertainty.

19. A time of flight sensor as recited in claim 18 wherein the binary code is a maximum length sequence (MLS).

* * * * *